Jan. 14, 1969   J. PAULKOVICH   3,422,352
APPARATUS FOR MEASURING CURRENT FLOW
Filed Sept. 14, 1965

INVENTOR
John Paulkovich
BY
ATTORNEYS

United States Patent Office 3,422,352
Patented Jan. 14, 1969

3,422,352
APPARATUS FOR MEASURING
CURRENT FLOW
John Paulkovich, Rockville, Md., assignor to the United
States of America as represented by the Administrator
of the National Aeronautics and Space Administration
Filed Sept. 14, 1965, Ser. No. 487,341
U.S. Cl. 324—120                                    11 Claims
Int. Cl. G01r 19/26; G01r 33/00

ABSTRACT OF THE DISCLOSURE

Apparatus for the measurement of electric current which provides an accumulated output of the total current measured over a time interval, involving the use of a saturable core transformer in which errors due to the magnetizing currents in the output winding of the transformer are avoided by isolating the output with an energy storage device.

---

The invention described herein may be manufactured and used by and for the Government of the United States of America for governmental purposes without the payment of any royalties thereon or therefor.

The invention herein described relates generally to current measuring instruments and more specifically to an ampere-hour integrator, that is, an electric current measuring instrument which gives an accumulated output of total current measured over a time interval.

Current measuring instruments are of particular importance in the design of satellites and spacecraft. Barring unforeseen failures, the life of the power supply in many instances determines the useful life of the satellite. Therefore, it is imperative to know the current potential of a battery or power supply of a particular design. Furthermore, since the life of the power supply is critical it is important to measure the current requirements of various circuits and components. From the information obtained from these measurements the designer is able to compare the power requirements of various circuits and components and select the ones capable of performing the desired functions with the least drain on the power supply. These measurements have heretofore been made with ampere-hour integrators of various types.

However, ampere-hour integrators are not limited to measuring the current utilized by satellite components and circuits or the current potential of a satellite power source, but are useful in other environments. For example, they are useful to measure the amount of current utilized in a laboratory to operate an experiment as well as for the general testing of electronic circuits to determine their efficiency. An ampere-hour integrator is also useful for comparison tests on such items as batteries or fuel cells as well as for the measurement of the capacity of electromechanical current generating systems, such as DC generators. A specific advantage of an ampere-hour integrator for test purposes resides in the ability to perform tests without the requirement for continual observation. For example an ampere-hour integrator provides an output which is a total accumulation of current withdrawn or current utilized for a time interval and an observation of this output at any particular time provides data as to the current utilized or withdrawn up to the time the observation is made.

One prior apparatus for ampere-hour integration includes a recording device for recording current rate on a strip chart recorder. The data is then processed by summing the area under the curve to determine the ampere-hours accumulated over a time interval. This is not only a slow and cumbersome task, but the accuracy depends on the quality of the strip recorder as well as on the approximations made by the personnel performing the summation. Another method of performing this measurement is to assume a continuous current rate over a period of time and then obtain the product of the current rate and the time. However, this system is inaccurate particularly when the current utilized fluctuates during the measuring interval and the amount of fluctuation is difficult to ascertain.

Other prior methods for ampere-hour integration employ a mechanical integrator, such as a ball and disc integrator, which operate off of the information recorded by the strip chart recorder. However these instruments have certain disadvantages. They are, in general, mechanical units which are subject to mechanical wear. In addition they are of relatively large physical size. Further, they are inaccurate since they depend on the accuracy of the recorder which is an integral part of the unit and recorders require frequent calibration because they are subject to drift.

Furthermore with prior art devices, even those using involved techniques, it becomes particularly difficult to achieve a high degree of accuracy (e.g. errors of ±1 percent) when small currents are to be measured.

Accordingly, it is an object of the invention to provide an ampere-hour integrator which embraces all of the advantages of similarly employed devices and possesses none of the aforementioned disadvantages. To attain this the invention contemplates the utilization of a unique current-to-frequency pulse converter, which incorporates a saturable core transformer whereby the current to be measured is converted to frequency pulses. The frequency of the resulting pulses is directly proportional to the current to be measured and by accumulating these pulses in a pulse counting circuit the accumulated count or total represents a direct measurement of the current applied to the integrator over a time interval.

A further object of the invention is to provide an ampere-hour integrator which is all electronic, of small size, and linear over a wide range.

The utilization of a current-to-frequency converter incorporating a saturable core transformer in an ampere-hour integrator results in an error caused by the magnetizing current of the transformer. While this error is insignificant when measuring large currents, it is of increasing significance when measuring small currents and may be of critical significance when measuring minute currents.

Therefore an additional object of the invention is to provide a current-to-frequency converter which eliminates the error caused by the magnetizing current in a current-to-frequency converter employing a saturable core transformer. To attain this the instant invention utilizes a saturable core transformer having three windings. Two of the windings are connected to a switching source and are alternately switched "on" and "off" for alternate polarization of the core of the transformer. The third winding is connected to the current source to be converted and creates a reflected current which adds to the current supplied to one winding by the switching source and subtracts from the current supplied to the second winding by the switching source. A voltage storage means, such as a capacitor, is connected to the additive winding and is energized by the inductive kick which occurs when the saturable core transformer is switched. Now, instead of the switching source providing the magnetization energy the energy stored is utilized to provide the energy to magnetize the additive winding. The capacitor thereby isolates the output from the effect of this magnetizing current but not from the current reflected by the third winding. Hence, the output from the system is directly related to the input applied to the third winding without the erroneous effect caused by the magnetizing current. This output, which is in current form, is applied to a voltage generator to generator a voltage output directly proportional thereto which is in turn applied to a voltage-to-frequency converter. The voltage-to-frequency converter generates a series of pulses having a frequency directly proportional to the applied voltage. Hence, the overall system is a current-to-frequency converter.

Included as a component part of the current-to-frequency converter is a novel current-to-voltage converter which eliminates the prior art problem relating to the error inherent in the output of a current-to-voltage converter incorporating a saturable core transformer. This error is caused by the magnetizing effect of the transformer.

Consequently, it is a subsidiary object of the invention to provide a current-to-voltage converter which incorporates a saturable core transformer and eliminates the effect of the error caused by the magnetizing current of the transformer. This result is obtained in the manner set forth above, specifically, a three winding alternately switched saturable core transformer is utilized in conjunction with an energy storage means. The energy storage means isolates the transformer output from the effect of the magnetizing current. The output is then applied to a voltage generating circuit resulting in a voltage output which is directly proportional to the current input.

The foregoing objects and many attendant advantages of this invention will be more readily appreciated as the same becomes better understood by reference to the following detailed description when considered in connection with the accompanying drawings wherein.

Figure 1:
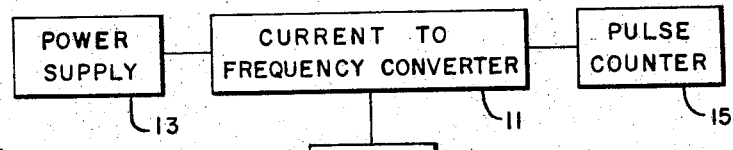
FIG. 1 is a block diagram of a preferred embodiment of the invention.

Turning now to a description of the figures wherein like reference numerals indicate like parts throughout the several figures, FIG. 1 is a block diagram of a preferred embodiment of the invention which includes a power supply 13, a pulse counter 15, as well as a current-to-frequency converter 11, which is hereinafter described. The power supply 13 is connected to the current-to-frequency converter 11 and provides DC power for bias voltages. Connected to the output from the current-to-frequency converter 11 is the pulse counter circuit 15 which accumulates the pulse output from the current-to-frequency converter. Also shown in FIG. 1 for illustration purposes is a battery 17 whose output current is to be measured by the ampere-hour integrator herein described. Obviously the battery 17 could constitute any current source such as a storage battery, fuel cell, DC generator, or other direct current generating device. Further as indicated above, the battery 17 could be replaced by a circuit or component whose current utilization over a period of time is to be measured.

Figure 2:
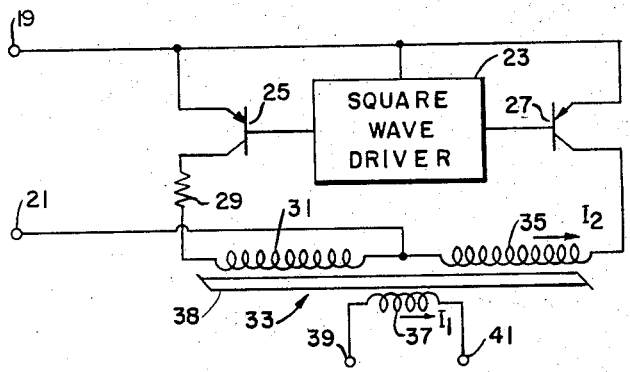
FIG. 2 is a partially schematic and partially block diagram of a portion of the invention utilized to describe the basic operation thereof.

FIG. 2 is illustrates the basic circuit, which is a current to-current converter, forming part of the current-to-frequency converter hereinafter described. FIG. 2 shows a first terminal 19 which is connected to the power supply 13 for applying power to a dual output square wave driver or control circuit 23 as well as the emitters of both a first and a second transistor 25, 27. The square wave driver outputs are each square wave chains of the same polarity but opposite energization, i.e., when one is "on" the other is "off." Further the frequency of these outputs is fixed and unrelated to the output from the overall current-to-frequency converter herein described. The bases of the first and second transistors 25, 27 are each electrically connected to one of the outputs of the square wave driver 23 for alternate energization. The collector of the first transistor 25 is connected via a resistor 29 to one end of a first winding 31 of a three winding saturable core transformer 33. The other end of the saturable core transformer's first winding 31 is connected to one end of a second winding 35 of the saturable core transformer 33. The other end of the second winding 35 is connected to the collector of the second transistor 27. The interconnection between the transformer's first and second windings 31 and 35 is connected to a second terminal 21 which is connected to the power supply 13 by means not herein shown. The third of the saturable core transformer's windings 37 is connected to two input terminals 39 and 41 which are adapted to be connected to the current source whose current is to be tested. The connections hereinbefore described are such that an alternate polarization of the saturable core transformer 33 occurs as the transistors 25 and 27 are alternately energized. Further, the third winding 37 is connected so that a flux generated therein reflects a current in the second winding 35 which adds to the current applied to the second winding by the second transistor 27.

The circuit set forth in FIG. 2 operates as follows: Assuming the current to be measured is $I_1$ and that it is initially 0; and further assuming that the first transistor 25 is turned on, then the core 38 of the saturable core transformer 33 is polarized in a "negative" saturation or phase direction. "Negative" and "Positive" as used herein are merely exemplary and only denote the relative phase direction of magnetic flux in the core of the transformer for the condition being illustrated, specifically the negative direction is 180° out of phase with the positive direction. The degree of saturation is controlled by the resistor 29 which limits the amount of current that can be applied to the first transformer winding 31. For the initial condition, set forth above, the current $I_2$ flowing through the second winding 35 will be 0. As the square wave driver circuit switches, it turns the first transistor 25 "off" and the second transistor 27 "on" polarizing the core in a "positive" saturation or phase direction. This switching creates a small magnetizing current $I_m$ in the transformer's second winding 35. This current $I_m$ is the only current flowing in the second winding and therefore is equal to the current $I_2$ when there is no current applied to the third winding 37, i.e., the current to be measured is 0. However, when a current to be measured $I_1$ is applied to the transformer's third winding 37 it causes an additional current to be added to the magnetizing current $I_m$. This is a result of the additive relation between the second and third windings 35, 37. $I_2$ will then be composed of the initial magnetizing current $I_m$ plus the reflected current $I_1$. Specifically the current through the second winding of the saturable core transformer 35 is represented as follows:

$$I_2 = I_m + (N_1/N_2)I_1$$

wherein:

$I_1$, $I_2$, and $I_m$ are as indicated above, $N_2$ equals the number of turns of the second winding and $N_1$ equals the number of turns of the third winding.

This current $I_2$ is proportional to the current being measured plus the magnetizing current created by the second transistor. Consequently, the circuit illustrated in FIG. 2 is a current-to-current converter with an output in series with the second winding 35.

Figure 3:
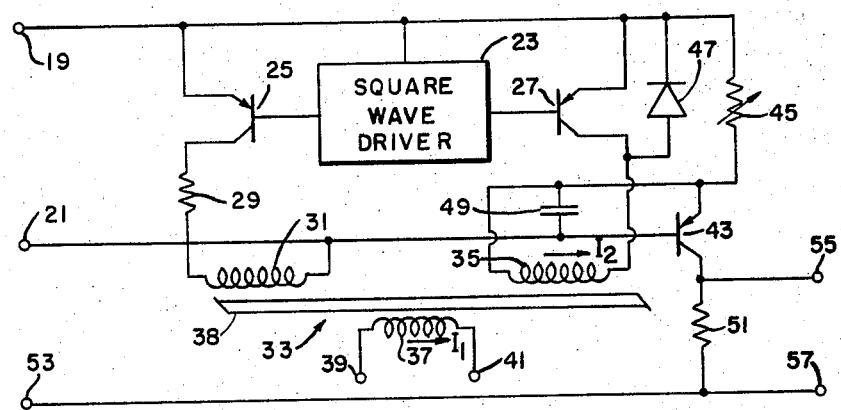
FIG. 3 is a partially schematic and partially block diagram of a current-to-voltage converter which forms a portion of the invention.

The aforementioned magnetizing current is an undesirable quantity because it is an unknown value that is of significant relative magnitude when low currents are measured. Further it is undesirable because it destroys a direct proportional relationship between the input current and the output. While this component cannot be eliminated the effect thereof can be minimized as illustrated by FIG. 3 and hereinafter described. FIG. 3 is similar to the basic circuit set forth in FIG. 2 with modifications directed toward the elimination of the effect of the magnetizing current. Specifically, the circuit set forth in FIG. 3 incorporates a dual output square wave driver circuit 23 connected to a first terminal 19 which is connected to a power source 13. In addition, the emitters of a first and a second transistor 25, 27 are connected to the first terminal 19. The bases of the first and second transistors are connected to the square wave driver 23 and driven thereby as hereinbefore described. The collector of the first transistor 25 is connected through a resistor 29 to one end of first winding 31 of a saturable core transformer 33. The other end of the first winding 31 is connected to a second terminal 21 which is connected to the power supply 13. However, the other end of the first winding 31 is not also connected to the second winding 35 as in FIG. 2; instead it is connected to the base of a third transistor 43. As in FIG. 2, one end of the second winding 35 is connected to the collector of the second transistor 27. The other end of the second winding 35 is connected via a variable resistor 45 to the emitter of the second transistor 27. Connected between the collector and the emitter of the second transistor 27 is a reversed biased diode 47. The emitter of the third transistor 43 is also connected to the other end of the second winding 35. Connected between the base and the emitter of the third transistor 43 is a capacitor 49 which is utilized as hereinafter described. The collector of the third transistor 43 is connected through a resistor 51 to a third terminal 53 which is connected to the power supply 13. As hereinafter described the output, taken across this last resistor 51, is a voltage directly proportional to the current applied to the third winding 37 through terminals 39, 41.

The purpose of the diode 47, connected between the collector and the emitter of the second transistor 27, is to protect the transistor 27 against the reverse current spike during the spike interval hereinafter described. Accordingly, where the second transistor 27 is so rated that it can withstand a reverse current of the magnitude of the spike, the diode 47 is not essential to the operation of the invention. With such a transistor, the collector-base junction acts to clamp the spike by the forward conduction at the junction.

It will be apparent to those skilled in the art that for proper operation, it is essential that the second winding 35 never saturate. To obtain this condition the conduction time of the second transistor 27 must be shorter than the time necessary to saturate the second winding 35. When the first transistor 25 conducts, the first winding 31 places the core 38 in a negative saturation state. When the second transistor 27 conducts, the core goes toward positive saturation by virtue of its winding 35, however, the second transistor 27 turns "off" prior to core saturation. To accomplish the above, either the driving source 23 can be unbalanced and/or the first and second windings 31, 35 can be unbalanced so that the first winding 31 always saturates the core and the second winding 35 never saturates the core.

The following is a description of the operation of the circuit set forth in FIG. 3 wherein advantage is taken of the residual and the magnetizing flux characteristics of the saturable core transformer 33 utilized by the instant invention. The magnetizing flux applied to the transformer minus the residual flux held in the core 38 actually represents a stored inductive charge. As a result, when the first transistor turns off, an undesirable voltage spike is developed across the windings of the transformer. This voltage spike is in excess of the bias voltage generated by the power supply 13 and applied to bias the first and second transistors 25, 27. So that this spike has substantially no effect on the second transistor 27, the diode 47, connected between the second transistor's emitter and collector, provides a by-pass therefor. The capacitor 49, connected between the base and emitter of the third transistor 43, essentially stores the voltage spike and maintains a cutoff bias on the third transistor 43 when no current is applied to third winding 37. This stored energy in the capacitor 49 is now capable of supplying the magnetizing current for the second winding 35. The adjustable resistor 45 is adjusted for an equilibrium balanced to drain off any excess energy stored by the capacitor 49. Now a current passed through the third winding 37 and reflected to the second winding 35 will be the major collector current for the third transistor 43. This collector current will induce an output voltage across the last resistor 51 which is directly proportional to the current of the third winding 37. Hence, the additional components comprise a voltage generating circuit whose output, when applied to a voltage measuring instrument, gives a voltage measurement which is a direct indication of the current input to the system. The foregoing circuit becomes a current-to-frequency converter having a pulse output which is also directly proportional to the current input by the addition of a voltage-to-frequency converter as hereinafter described and illustrated in FIG. 4.

Figure 4:
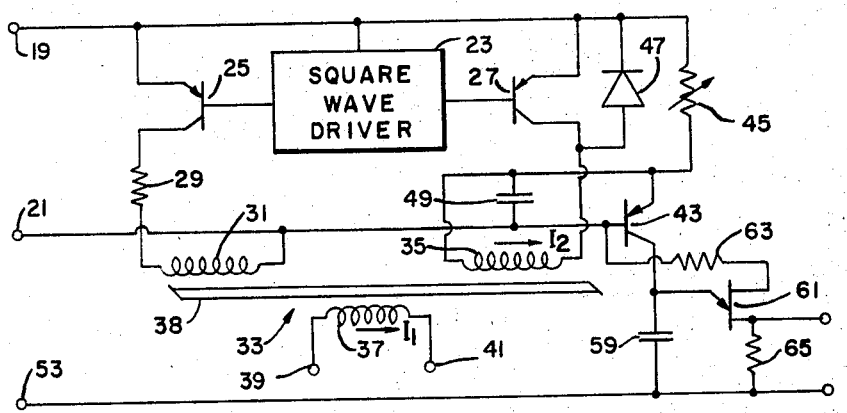
FIG. 4 is a partially schematic and partially block diagram of a current-to-frequency converter which forms a portion of the invention and is utilized in the preferred embodiment of the invention described herein.

FIG. 4 is essentially identical to FIG. 3 with some additional components to provide the voltage-to-frequency conversion necessary for the overall system to become a current-to-frequency converter. Specifically, the output voltage resistor 51 shown in FIG. 3 is replaced with a capacitor 59 in FIG. 4. The input to the emitter of a unijunction transistor 61 is connected between the capacitor 59 and the collector of the third transistor 43. The base of the third transistor 43 is connected via a resistor 63 to the first base of the unijunction transistor 61. A resistor 65 is connected between the second base of the unijunction transistor 61 and the third terminal 53 which is connected to the power supply 13. The pulse output from the system is taken across this latter resistor 65. For the circuit illustrated in FIG. 4, the rate of charge on the capacitor 59 is directly proportional to the current applied to the saturable core transformer's third winding 37. Further, because of unijunction transistor, when connected as herein described, generates pulses having a repetition rate proportional to the rate of charge of the capacitor 59, the output pulse rate taken across the resistor 65 is also directly proportional to the input current. By applying this output to a pulse counter an accumulated indication of the current applied to the third winding is obtained for the time interval of application.

In the preferred embodiment, herein disclosed, the electrical power supply means consists of any conventional method of providing the required DC bias for the transistors and the driver. The driver circuitry is also conventional and may consist, for example, of a Royer oscillator as a clock reference to operate a pair of relays to alternately energize the first and second transistors. Further the pulse counting circuit may consist of one shot multivibrator and a conventional pulse accumulating circuit. However, the foregoing is merely exemplary and any conventional circuitry which will perform the desired function may be utilized.

It will be noted, by reviewing the foregoing description of the preferred embodiment of the invention that all of the objects herein set forth have been attained. Specifically, a current-to-voltage converter, and a current-to-frequency converter have been disclosed. The overall system is an ampere-hour integrator wherein current to be measured is converted to frequency pulses, the frequency thereof being proportional to the current. These pulses are accumulated by the pulse counter with the accumulated total representing the total current applied to the apparatus during a time interval.

Many modifications and variations of the present invention are possible in the light of the above teachings. For example, FIG. 4 teaches obtaining the pulse output across the resistor connected to the second base of the unijunction transistor which results in a positive pulse output. However, it will be appreciated by those skilled in the art that if a negative pulse output is desired this can be obtained by taking the output across the resistor connected to the first base of the unijunction transistor. It is therefore to be understood, that within the scope of the appended claims, the invention may be practiced otherwise than as specifically described.

What is claimed is:

1. Apparatus for measuring current flow over a time interval comprising:
   (a) current-to-frequency converting means fro producing a pulse chain output, the frequency of the pulses being directly proportional to the current applied thereto;
   (b) counting means for counting pulses and providing an indication of the accumulated total of the pulses counted;
   (c) said current-to-frequency converting means having input terminals adapted for connection to a current source and an output connected to said counting means;
   (d) electrical power supply means connected to said current-to-frequency converting means for supplying electrical power thereto;
   (e) said current-to-frequency converting means comprising;
      (1) first switching means,
      (2) second switching means,
      (3) control means electrically connected to said first and second switching means for alternately turning on and off said first and second switching means,
      (4) transformer means having first, second, and third windings,
      (5) said first switching means electrically connected to said first winding of said transformer means for creating a magnetic field in said transformer means in one phase direction,
      (6) said second switching means electrically connected to said second winding of said transformer means for creating a magnetic field in said transformer means 180° out of phase with the magnetic field created in said transformer means by said first switching means,
      (7) said third winding of said transformer means connected to said input terminals,
      (8) voltage generating means connected between said first and second windings of said transformer means for generating a voltage output which is directly proportional to the current applied to the input terminals connected to said third winding of said transformer means, and
      (9) voltage-to-frequency converting means connected to the output of said voltage generating means for generating an output pulse chain, the frequency of said pulse chain being directly proportional to the voltage output of said voltage generating means; and
   (f) said voltage generating means comprising;
      (1) a transistor, the base of said transistor electrically connected to other end of said first winding of said transformer, and the collector of said transistor electrically connected to said electrical power supply means,
      (2) a capacitor electrically connected between the base and emitter of said transistor, and
      (3) a variable resistor connected between the emitter of said transistor and said second switching means.

2. Apparatus for converting current to voltage comprising:
   (a) first switching means;
   (b) second switching means;
   (c) control means electrically connected to said first and second switching means for alternately turning on and off said first and second switching means;
   (d) transformer means having first, second, and third windings;
   (e) said first switching means electrically connected to said first winding of said transformer means for creating a magnetic field in said transformer means in one phase direction;
   (f) said second switching means electrically connected to said second winding of said transformer means for creating a magnetic field in said transformer means 180° out of phase with the magnetic field created in said transformer means by said first switching means;
   (g) input terminals connected to said third winding of said transformer means;
   (h) voltage generating means connected between said first and second windings of said transformer means for generating the voltage output which is directly proportional to the current applied to the input terminals connected to said third winding of said transformer means;
   (i) said first switching means, second switching means, and voltage generating means having power terminals for connections to an electrical power supply means; and
   (j) said voltage generating means comprising;
      (1) a transistor, the base of said transistor electrically connected to the other end of said first winding of said transformer,
      (2) the emitter of said transistor electrically connected to said second winding of said transformer and the collector of said transistor electrically connected to said power terminals,
      (3) a capacitor electrically connected between the base and emitter of said transistor, and
      (4) a variable resistor connected between the emitter of said transistor and said second switching means.

3. Apparatus for converting current to frequency comprising:
   (a) first switching means;
   (b) second switching means;
   (c) control means electrically connected to said first and second switching means for alternately turning on and off said first and second switching means;
   (d) transformer means having first, second, and third windings;
   (e) said first switching means electrically connected to said first winding of said transformer means for creating a magnetic field in said transformer means in one phase direction;
   (f) said second switching means electrically connected to said second winding of said transformer means for creating a magnetic field in said transformer means 180° out of phase with the magnetic field created in said transformer means by said first switching means;
   (g) input terminals connected to said third winding of said transformer means;
   (h) voltage generating means connected between said first and second windings of said transformer means for generating a voltage output which is directly proportional to the current applied to the input terminals connected to the third winding of said transformer means;
   (i) voltage-to-frequency converting means connected to the output of said voltage generating means for generating an output pulse chain, the frequency thereof being directly proportional to the voltage of said voltage generating means;
   (j) said first switching means, second switching means, voltage generating means, and said voltage-to-frequency converting means having power terminals for connection to an electrical power supply means; and
   (k) said voltage generating means comprising;
      (1) a transistor, the base of said transistor electrically connected to said first winding of said transformer, the emitter of said transistor electrically connected to said second winding of said transformer, and the collector of said transistor electrically connected to said power terminals.
(2) a capacitor electrically connected between the base and the emitter of said transistor, and
(3) a variable resistor connected between the emitter of said transistor and said second switching means.

4. Apparatus for measuring current flow over a time interval comprising:
(a) current-to-frequency converting means for producing a pulse chain output, the frequency of the pulses being directly proportional to the current applied thereto;
(b) counting means for counting pulses and providing an indication of the accumulated total of the pulses counted;
(c) said current-to-frequency converting means having input terminals adapted for connection to a current source and an output connected to said counting means;
(d) electrical power supply means connected to said current-to-frequency converting means for supplying electrical power thereto;
(e) said current-to-frequency converting means comprising;
  (1) first switching means,
  (2) second switching means,
  (3) control means electrically connected to said first and second switching means for alternately turning on and off said first and second switching means,
  (4) transformer means having first, second, and third windings,
  (5) said first switching means electrically connected to said first winding of said transformer means for creating a magnetic field in said transformer means in one phase direction,
  (6) said second switching means electrically connected to said second winding of said transformer means for creating a magnetic field in said transformer means 180° out of phase with the magnetic field created in said transformer means by said first switching means,
  (7) said third winding of said transformer means connected to said input terminals,
  (8) voltage generating means connected between said first and second windings of said transformer means for generating a voltage output which is directly proportional to the current applied to the input terminals connected to said third winding of said transformer means, and
  (9) voltage-to-frequency converting means connected to the output of said voltage generating means for generating an output pulse chain, the frequency of said output pulse chain being directly proportional to the voltage output of said voltage generating means;
(f) said control means comprising a square wave driving circuit having first and second outputs;
(g) said first switching means comprising a transistor switch having the base electrically connected to the first output of said square wave driving circuit, the emitter electrically connected to said electrical power supply means, and the collector electrically connected to one end of said first winding of said transformer means;
(h) said second switching means comprising a transistor switch having the base electrically connected to the second output of said square wave driving circuit, the emitter electrically connected to said electrical power supply means, and the collector connected to one end of said second winding of said transformer means;
(i) said transformer means comprising a saturable core transformer; and
(j) said voltage generating means comprising;
  (1) a transistor with the base of said transistor electrically connected to the other end of said first winding of said saturable core transformer, the emitter of said transistor electrically connected to the other end of said second winding of said saturable core transformer, and the collector of said transistor electrically connected to said electrical power supply means,
  (2) a capacitor electrically connected between the base and the emitter of said transistor, and
  (3) a variable resistor connected between the emitter of said transistor and the emitter of the transistor comprising said second switching means.

5. Apparatus for converting current to voltage comprising:
(a) first switching means;
(b) second switching means;
(c) control means electrically connected to said first and second switching means for alternatively turning on and off said first and second switching means;
(d) transformer means having first, second, and third windings;
(e) said first switching means electrically connected to said first winding of said transformer means for creating a magnetic field in said transformer means in one phase direction;
(f) said second switching means electrically connected to said second winding of said transformer means for creating a magnetic field in said transformer means 180° out of phase with the magnetic field created in said transformer means by said first switching means;
(g) input terminals connected to said third winding of said transformer means;
(h) voltage generating means connected between said first and second windings of said transformer means for generating a voltage output which is directly proportional to the current applied to the input terminals connected to said third winding of said transformer means;
(i) said control means comprising a square wave driving circuit having first and second outputs;
(j) said first switching means comprising a transistor switch having the base electrically connected to the first output of said square wave driving circuit, the emitter adapted for connection to an electrical power supply means, and the collector connected to one end of said first winding of said transformer means;
(k) said second switching means comprising a transistor switch having the base electrically connected to the second output of said square wave driving circuit, the emitter adapted for connection to an electrical power supply means, and the collector connected to one end of said second winding of said transformer means;
(l) said transformer means comprising a saturable core transformer; and
(m) said voltage generating means comprising;
  (1) a transistor, the base of said transistor electrically connected to the other end of said first winding of said saturable core transformer, the emitter of said transistor electrically connected to the other end of said second winding of said saturable core transformer, and the collector of said transistor electrically connected to said electrical power supply means,
  (2) a capacitor electrically connected between the base and the emitter of said transistor, and (3) a variable resistor connected between the emitter of said transistor and the emitter of the transistor switch of said second switching means.

6. Apparatus for converting current to frequency comprising:
    (a) first switching means;
    (b) second switching means;
    (c) control means electrically connected to said first and second switching means for alternately turning on and off said first and second switching means;
    (d) transformer means having first, second, and third windings;
    (e) said first switching means electrically connected to said first winding of said transformer means for creating a magnetic field in said transformer means in one phase direction;
    (f) said second switching means electrically connected to said second winding of said transformer means for creating a magnetic field in said transformer means 180° out of phase with the magnetic field created in said transformer means by first switching means;
    (g) input terminals connected to said third winding of said transformer means;
    (h) voltage generating means connected between said first and second windings of said transformer means for generating a voltage output which is directly proportional to the current applied to the input terminals connected to said third winding of said transformer means;
    (i) voltage-to-frequency converting means connected to the output of said voltage generating means for generating an output pulse chain, the frequency of the pulses being directly proportional to the voltage output of said voltage generating means;
    (j) said control means comprising a square wave driving circuit having first and second outputs;
    (k) said first switching means comprising a transistor switch having the base electrically connected to the first output of said square wave driving circuit, the emitter adapted for connection to an electrical power supply means, and the collector connected to one end of said first winding of said transformer means;
    (l) said second switching means comprising a transistor switch having the base electrically connected to the second output of said square wave driving circuit, the emitter adapted for connection to an electrical power supply means, and the collector connected to one end of said second winding at said transformer means;
    (m) said transformer means comprising a saturable core transformer; and
    (n) said voltage generating means comprising;
        (1) a transistor, the base of said transistor electrically connected to the other end of said first winding of said saturable core transformer, the emitter at said transistor electrically connected to the other end of said second winding of said saturable core transformer, and the collector of said transistor electrically connected to an electrical power supply means,
        (2) a capacitor electrically connected between the base and the emitter of said transistor, and
        (3) a variable resistor connected between the emitter of said transistor and the emitter of the transistor switch said second switching means.

7. Apparatus set forth in claim 4 including:
    a reverse biased diode connected between the emitter and collector of the transistor comprising said second switching means.

8. Apparatus set forth in claim 7 wherein said voltage-to-frequency converting means comprises:
    a unijunction transistor having a first base, a second base and an emitter;
    a first resistor;
    a second resistor;
    a capacitor;
    the emitter of said unijunction transistor electrically connected to the collector of the transistor in said voltage generating circuit;
    the first base of said unijunction transistor electrically connected through said first resistor to the base of the transistor in said voltage generating circuit;
    the capacitor and second resistor electrically connected in series between the emitter and second base of said unijunction transistor;
    the junction between said capacitor and said second resistor electrically connected to said electrical power supply means; and
    the pulse output from said voltage-to-frequency converting means being taken across said second transistor.

9. Apparatus set forth in claim 5 including:
    a reverse biased diode connected between the emitter and collector of the transistor comprising said second switching means.

10. Apparatus set forth in claim 6 including:
    a reverse biased diode connected between the emitter and collector of the transistor comprising said second switching means.

11. Apparatus set forth in claim 10 wherein said voltage-to-frequency converting means comprises:
    a unijunction transistor having a first base, a second base and an emitter;
    a first resistor;
    a second resistor;
    a capacitor;
    the emitter of said unijunction transistor electrically connected to the collector of the transistor in said voltage generating circuit;
    the first base of said unijunction transistor electrically connected through said first resistor to the base of the transistor in said voltage generating circuit;
    the capacitor and second resistor electrically connected in series between the emitter and second base of said unijunction transistor;
    the junction between said capacitor and said second resistor adapted for connection to an electrical power supply means; and
    the pulse output from said voltage-to-frequency converting means being taken across said second transistor.

References Cited

UNITED STATES PATENTS

| | | | |
|---|---|---|---|
| 2,856,584 | 10/1958 | Stratton | 324—117 |
| 2,888,645 | 5/1959 | Hoft et al. | 324—117 |
| 3,064,193 | 11/1962 | Grubb et al. | 324—120 |
| 3,201,781 | 8/1965 | Holland | 324—120 XR |

OTHER REFERENCES

Moulton, C. H.: "Light Pulse System Shrinks High-Voltage Protection Device," Electronics, May 17, 1965, pp. 71 through 76.

RUDOLPH V. ROLINEC, *Primary Examiner.*

E. F. KARLSEN, *Assistant Examiner.*

U.S. Cl. X.R.

324—117, 127